United States Patent [19]

Leyse

[11] 4,393,025

[45] Jul. 12, 1983

[54] METHOD OF AND APPARATUS FOR MEASURING THE POWER DISTRIBUTION IN NUCLEAR REACTOR CORES

[76] Inventor: Robert H. Leyse, 11114 Whisperwood La., Rockville, Md. 20852

[21] Appl. No.: 206,741

[22] Filed: Nov. 14, 1980

Related U.S. Application Data

[63] Continuation of Ser. No. 913,977, Jun. 7, 1978, abandoned.

[51] Int. Cl.³ ............................................. G21C 17/00
[52] U.S. Cl. .................................................. 376/247
[58] Field of Search ............................. 376/245, 247; 136/230–233, 224; 73/1 F, 15 B, 359 R, 361; 250/336, 390, 391, 392, 393, 395

[56] References Cited

U.S. PATENT DOCUMENTS

| | | | |
|---|---|---|---|
| 2,398,606 | 4/1946 | Wang | 73/15 B |
| 2,502,399 | 3/1950 | Greef | 136/224 |
| 2,854,844 | 10/1958 | Howell | 73/1 F |
| 2,911,824 | 11/1959 | Czerlinsky et al. | 73/15 P |
| 3,000,803 | 9/1961 | Morris et al. | 136/230 |
| 3,033,985 | 5/1962 | Petree | 250/390 |
| 3,077,539 | 2/1963 | Blau, Jr. et al. | 73/1 F |
| 3,260,102 | 7/1966 | Werner | 73/1 F |
| 3,263,502 | 8/1966 | Springfield | 136/224 |
| 3,499,310 | 3/1970 | Hundere et al. | 73/1 F |
| 4,298,430 | 11/1981 | Rolstad et al. | 376/247 |

OTHER PUBLICATIONS

IEEE Trans. on Nuc. Sci., (2/79), vol. NS-26, No. 1, Part 1, pp. 934-943, Leyse et al., Gamma Thermometer for LWR. ISA-Transactions, vol. 9, No. 2, Jackson, pp. 88-93, 1970, 73-361.
ASTM Bulletin, (2/56), Gilbo, pp. 68-74, 136-224.
ARI Industries, Multilevel Temperature Profiling Assembly, (9/76).

*Primary Examiner*—Sal Cangialosi
*Attorney, Agent, or Firm*—William D. Hall

[57] ABSTRACT

The invention disclosed is the method of exact calibration of gamma ray detectors called gamma thermometers prior to acceptance for installation into a nuclear reactor core. This exact calibration increases the accuracy of determining the power distribution in the nuclear reactor core. The calibration by electric resistance heating of the gamma thermometer consists of applying an electric current along the controlled heat path of the gamma thermometer and then measuring the temperature difference along this controlled heat path as a function of the amount of power generated by the electric resistance heating. Then, after the gamma thermometer is installed into the nuclear reactor core and the reactor core is operating at power producing conditions, the gamma ray heating of the detector produces a temperature difference along the controlled heat path. With the knowledge of this temperature difference, the calibration characteristic determined by the prior electric resistance heating is employed to accurately determine the local rate of gamma ray heating. The accurate measurement of the gamma heating rate at each location of a set of locations throughout the nuclear reactor core is the basis for accurately determining the power distribution within the nuclear reactor core.

28 Claims, 8 Drawing Figures

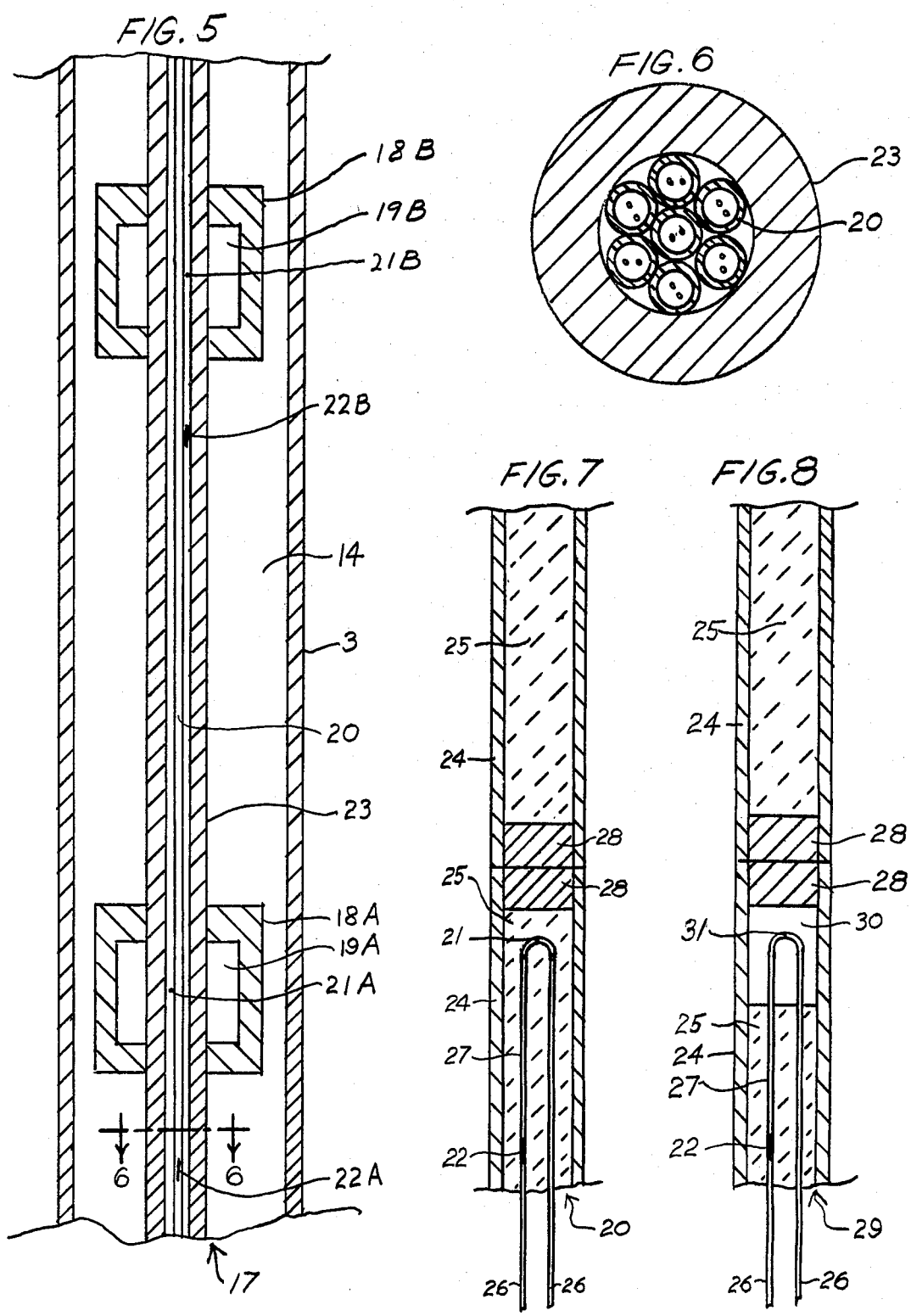

METHOD OF AND APPARATUS FOR MEASURING THE POWER DISTRIBUTION IN NUCLEAR REACTOR CORES

This is a continuation of application Ser. No. 913,977, filed June 7, 1978 now abandoned.

BACKGROUND OF THE INVENTION

The determination of the power distribution in large nuclear reactor cores is necessary in order to insure that the core is operated under optimum conditions and within safety limits on the linear rate of heat production in the nuclear fuel rods. Since the beginning of nuclear power, the trend has been to place more and more emphasis on detailed monitoring of the power distribution of the nuclear reactor core, both from the viewpoint of adhering to federal regulations and also from the viewpoint of plant operating efficiency.

The determination of the core power distribution within present large light water reactors is subject to uncertainties which arise from two major areas.

1. The measurements themselves, that is, the detector signals from the many detectors that are located throughout the nuclear reactor core.

2. The analytic conversion of these detector signals into a meaningful parameter, that is, the power distribution within the nuclear reactor core.

The detectors presently used in light water reactors are based upon neutron flux measurement, and these neutron flux measurements are then treated analytically to produce values for the power distribution within the nuclear core.

The measurement errors (item 1) include uncertainty in correction for burnup of detector absorber, manufacturing tolerances, interference from gamma radiation, precise location of the detector within its guide tube, presence of steam voids, coolant temperature, soluble boron content of the coolant, and the exact composition of the fuel bundle, proximity of control rods, and exposure. The analytic conversion of the in-core detector signals (item 2) is a complicated procedure which involves a number of basic assumptions as well as pre-calculated constants from analysis of the characteristics of core and are subject to errors of knowledge of the exact condition of the nuclear reactor core, especially the amount and distribution of fuel burnup, and are also subject to judgments made by the designers of the calculational programs.

The power distribution determination within large heavy water reactors, in contrast to the above described practices for light water reactors, have been largely based on measurements of gamma ray intensity rather than on neutron flux.

Recently, on a trial basis, the power distribution within a light water reactor was determined based on gamma ray intensity and the power distribution thus determined was found to be superior to a determination that was based on neutron flux measurements. The superior determination based on gamma ray intensity measurements results from the elimination of many of the above described errors in neutron flux measurement. However, the gamma ray detectors which were used for these measurements employed ionization chambers which are subject to failures from electrical breakdown and therefore have limited lifetime in the nuclear reactor environment.

The gamma ray detectors which have been employed in the large heavy water cores are called gamma thermometers. In the gamma thermometer, gamma flux is used to heat a strip of metal. One end of this metal is in direct contact with a heat sink and the heat produced by the absorption of gamma rays is transferred along the length to the heat sink. Typically, two thermocouples are used to measure the temperature gradient along the length between the uncooled end and the cooled end. Thus, the more intense the gamma ray flux, the higher the rate of heating of the strip of metal, and the higher the temperature gradient along the length of the strip. For a strip of uniform cross sectional area and cooled at one end as described above, the following equation applies:

$$\Delta T = qL^2/2K$$

where:
$\Delta T$ = temperature difference
$L$ = distance between thermocouples
$K$ = thermal conductivity of the metal
$q$ = rate of heat generation within metal The heavy water reactors in which these gamma thermometers have been utilized have alternate means for calibrating the gamma thermometers. Thus, in two different heavy water core types, it is possible to accurately measure the total power generated in nuclear fuel rods immediately surrounding a tube which contains several gamma thermometer detectors along its length. This provides a basis for calibrating the gamma thermometer signals in terms of surrounding reactor powder, but the calibration is incomplete because of large power intensity variations along the length of the nuclear fuel rod, and the calibration applies to the total signal output of the series of gamma thermometers along the length of the fuel rod rather than an individual gamma thermometer. Therefore, additional measurements are necessary in order to calibrate each gamma thermometer in terms of local power generation in the nuclear reactor fuel. This additional measurement includes determining the neutron flux distribution along the length of the nuclear reactor core. This neutron flux distribution is measured by momentarily inserting a long metallic wire alongside the tube of gamma thermometers while the nuclear reactor core is operating at power. The metallic wire becomes radioactive from neutron absorption, and the intensity of radioactivity induced varies along the length as the neutron flux varies along the length. Following a brief irradiation by neutrons within the nuclear reactor core, the metallic wire is withdrawn from the nuclear reactor core and the radioactivity per unit length is measured along the length utilizing appropriate measuring equipment. With this measurement and a knowledge of the construction of the reactor core and application of principles of nuclear reactor core neutron physics, it then is possible to determine the distribution of power generation along the length of the surrounding nuclear fuel rods described above. With this knowledge of power distribution along the length of the fuel rods, and also the total power along the length of the fuel rods as described above, it is then possible to calculate the local power of the surrounding fuel rods at all locations along the length of the surrounding fuel rods. Thus, it is possible to determine the calibration of the signal from each gamma thermometer in relation to the local power intensity of the fuel immediately surrounding each gamma detector. This calibration procedure is cumbersome and yields only a single point calibration that usually is attained when the nuclear reactor is at a relatively high steady power level. The calibration is subject to errors including those which result from calculating the local power generation based on neutron flux measurement.

The present invention is an improved method of calibrating gamma thermometers and is primarily intended for application in determining the power distribution in large light water moderated nuclear reactor cores that are employed as the energy source in nuclear electric power plants. The present invention provides greater accuracy in the determination of the power distribution in a nuclear reactor core, and thus makes it possible to operate the nuclear reactor core more effectively in terms of power distribution within the nuclear core and also the ability to operate the nuclear core at peak rated powers. The present invention can be employed in any type of nuclear reactor core, including the heavy water moderated reactors, liquid metal cooled reactors, gas-cooled reactors and other specialized reactor types.

The method of electric calibration of gamma thermometers yields much more accurate calibrations of the gamma thermometers than can be achieved by other means. This higher degree of accuracy of the gamma thermometer calibration then means that the power distribution within the nuclear reactor core may be more accurately determined than with present forms of power distribution monitoring for nuclear reactor cores, especially light water moderated nuclear power reactor cores.

SUMMARY OF THE INVENTION

The present invention makes possible the direct calibration of the gamma thermometer by electrical resistance heating prior to installation in the nuclear reactor core. In addition, in certain embodiments, the calibration by electrical resistance heating can also be achieved after the equipment is installed into the nuclear reactor core. This electrical calibration results in the exact determination of the temperature difference across the heat transfer path of the gamma thermometer as a function of the rate of power generation within the gamma thermometer. Then, with an array of gamma thermometer detectors logically dispersed throughout a nuclear reactor core, it is possible to establish the local rate of gamma heating at each detector by reference to each calibration. With the knowledge of these exact rates of local gamma heating it is then possible to determine the power distribution throughout the entire nuclear reactor core.

One form of apparatus which I may use in conjunction with this invention includes an elongated tube with a series of short sealed chambers along spaced locations along the outer wall of the tube. These chambers divert the cooling water away from the portions of the tube which they surround and they are evacuated and/or contain a gas so that they prevent the cooling water from lowering the temperature of the portion of the tube which they surround to the same extent that the cooling water lowers the temperature of the other portions of the tube. The heat distribution along the tube is measured and this monitors the power distribution along the adjacent nuclear fuel rods. This apparatus can be calibrated by the aforesaid electrical resistance heating method. However, this apparatus should preferably be calibrated prior to installation into the nuclear reactor core.

DESCRIPTION OF THE DRAWINGS

Eight figures have been provided to illustrate the method of determining the power distribution in a nuclear reactor core.

FIG. 5 is a section view of another embodiment of the gamma thermometer detector.

FIG. 6 is a section view along line 6—6 of FIG. 5.

FIG. 7 is an enlarged view of item 20 of FIG. 5.

FIG. 8 illustrates a differential thermocouple construction with an open chamber at one junction.

DETAILED DESCRIPTION OF THE INVENTION

My invention comprises a method which may be practiced upon any gamma thermometer construction suitable for calibration by electric resistance heating. I will first describe one suitable gamma thermometer upon which my method may be practiced.

Figure 1:
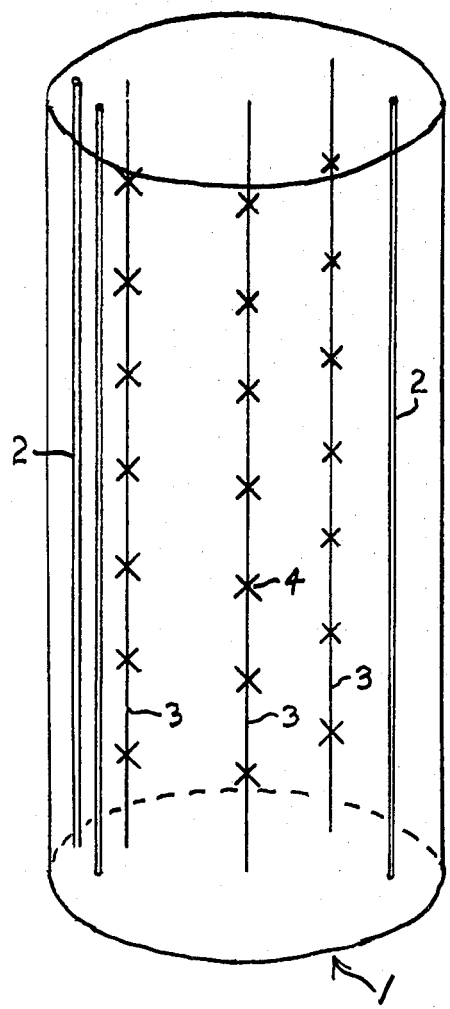
FIG. 1 is a view of a nuclear reactor core illustrating the dispersion of gamma thermometer locations among the fuel rods.

In FIG. 1, the number 1 designates the nuclear reactor core which consists of a series of vertical fuel rods 2 held in position by open mechanical supports. Several instrumentation tubes 3 are installed among the fuel rods. Instrument rods are installed within these instrument tubes and each instrument rod contains several gamma thermometers along the length as indicated by the symbol X and identified as 4.

Figure 2:
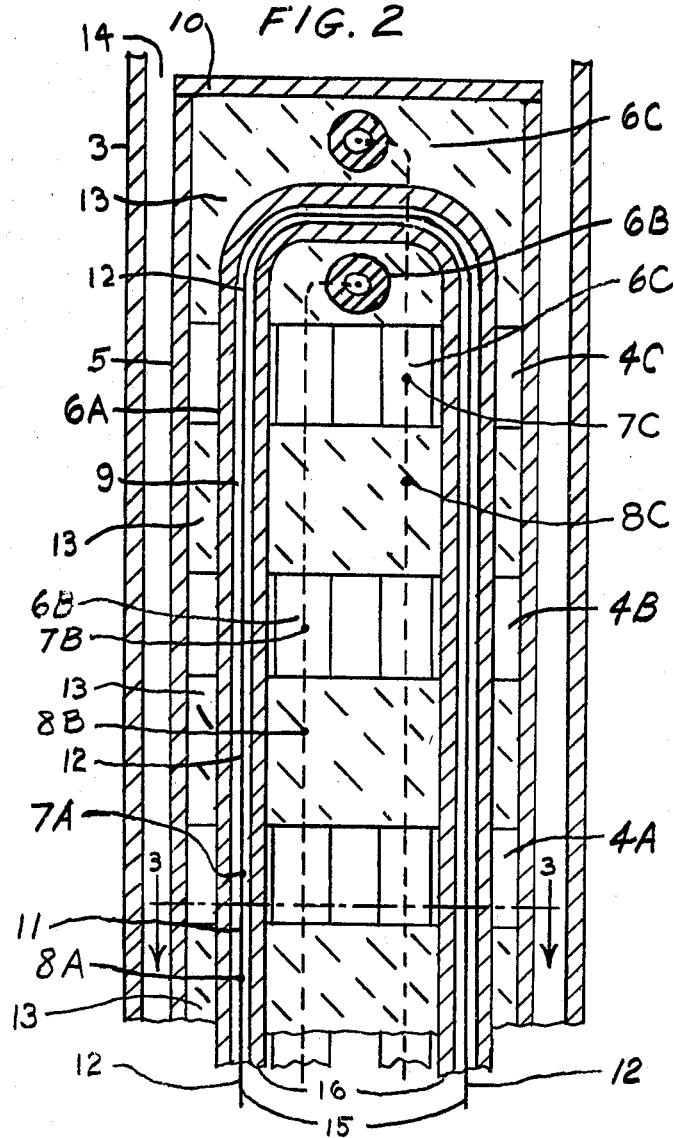
FIG. 2 is a section view of one gamma thermometer detector chamber.

The details of the gamma thermometer are shown in FIG. 2. The assembly is positioned within the instrument tube 3 with a passage for coolant flow 14 between tube 3 and the gamma therometer containment tube 5. For the present discussion, all tubes may be considered to be cylindrical, although other shapes could be employed.

The gamma thermometer chamber 4A is either gas-filled or held at vacuum and has a defined length between the electrically insulating but heat conducting ceramic bodies 13. These ceramic bodies are tightly fitted within the containment tube 5 which is either drawn, swaged, or otherwise brought in tight contact with the bodies 13.

Thermocouple junctions 7 and 8 are located within the thermocouple tube 6A and are electrically insulated from the thermocouple tube 6A by means of ceramic insulation 9. The thermocouple junctions are differentially constructed such that the signal measured at the terminals 15 consists of the difference between the voltage signals from thermocouple junctions 7 and 8.

With the nuclear reactor core operating at power, gamma ray absorption will cause heating of all materials within the nuclear reactor core. The heat produced within the gamma thermometer assembly is removed by the coolant flow in the passage 14. The containment tube 5 is in direct contact with the cooling fluid and the temperature of this surface is only slightly greater than the flowing coolant temperature. The ceramic bodies 13 are in tight contact with the containment tube 5 and reach maximum interior temperatures only a few degrees centigrade greater than the containment tube 5. The thermocouple tube 6A is in tight contact with the ceramic body 13 at the location of the thermocouple junction 8 and this thermocouple junction operates within a few degrees centigrade of the containment tube 5.

The thermocouple tube 6A within the chamber 4A is not in close thermal contact with any material except at each end of the chamber where there is tight thermal contact with the ceramic bodies 13. Under these conditions heat flow is along the axis of the thermocouple tube to the ceramic bodies at each end of the chamber. If the thermocouple junction 7 is located exactly between the ceramic bodies 13 and if the distance between the ceramic bodies is L, the temperature difference, $\Delta T$, between the thermocouple junction 7 and the thermocouple junction 8 will be very nearly equal to $$\Delta T = qL^2/8K \tag{1}$$

where q = heat generation rate per unit volume within the thermocouple tube and

K = heat conductivity of the thermocouple tube.

In the as constructed gamma thermometer assemblies there will be some departures from this exact relationship because of inexact centering of the thermocouple junction 7 and possible other dimensional and constructional irregularities. Item 10 of FIG. 2 is an upper end cap which seals the internals against water entry from the top end. The lower end of the containment tube exits the reactor core through sealing arrangements and leads to the electrical measuring and calibration equipment.

Figure 3:
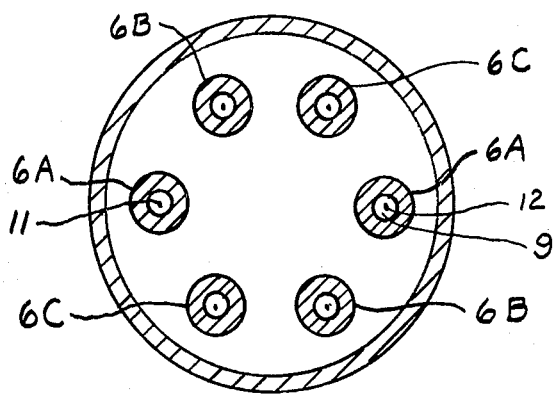
FIG. 3 is a section view along line 3—3 of FIG. 2.

The containment tube 5 can house several gamma thermometer detectors along its length. FIG. 3 is a section view of chamber 4A and shows the thermocouple tubes 6A, but also illustrates the set of thermocouple tubes 6B and the set 6C which lead to chambers 4B and 4C as shown in FIG. 2. The thermocouple tubes 6B and 6C are shown in FIG. 2 as they pass through chambers 4A, 4B and 4C. The thermocouple tube 6A is shown completely in cross section in FIG. 2 and the sections of 6B ad 6C appear at the upper part of FIG. 2 where these thermocouple tubes appear in the section. Thermocouple tube 6B has a set of thermocouple junctions for chamber 4B which correspond to the thermocouple junction set consisting of junctions 7 and 8 in thermocouple tube 6A and associated with chamber 7A. Likewise, thermocouple tube 6C has a set of thermocouple junctions for chamber 4C which correspond to the thermocouple junction set consisting of junctions 7 and 8 in thermocouple tube 6A and associated with chamber 7A. The drawings of FIG. 2 and FIG. 3 illustrate tubular assembly consisting of three gamma thermometer chambers 4A, 4B and 4C and the associated thermocouple tubes 6A, 6B and 6C. However, it is possible to construct these tubular assemblies of gamma thermometer chambers with a greater total number of chambers along the length than are illustrated in FIG. 2 and FIG. 3.

I will next describe the method of calibration, having described the equipment and the heat flow paths during power operation of the nuclear reactor core.

The method of electric resistance heating of the thermocouple tube 6A is employed in order to yield an exact calibration of the gamma thermometer detector. This electrical calibration is performed after fabrication of the rod of gamma thermometer detectors but prior to installation of this rod into the nuclear reactor core.

The detector assembly is first placed within suitable apparatus in order to establish fluid cooling conditions identical to the fluid cooling conditions that will be present when the detector assembly is operating within the nuclear reactor core. For light water cooled reactors, typical conditions of the surrounding cooling water are a temperature of approximately 300° C., of approximately 150 atmospheres, and a cooling water flow along the length of the gamma thermometer assembly of approximately seven meters per second. An electric current is then passed through the thermocouple tube by utilizing the ends 16 of thermocouple tube 6A, for example for the electrical connections. The electric current and the voltage applied to the terminals 16 are very accurately determined and recorded. The total power will thus be measured and the heat generation per unit length of the thermocouple tube is thus known very accurately.

With cooling conditions established and power applied as described, a temperature difference, $\Delta T$, will result between hot thermocouple junction 7 and colder thermocouple junction 8 within thermocouple tube 6A. Thus, for each value q' of power per unit length of thermocouple tube 6A, it is possible to measure a corresponding value, $\Delta T$, of the temperature difference between thermocouple junction 7 and junction 8 of tube 6A. Thus, calibrations are performed at several values of power per unit length q', with a measurement of $\Delta T$ at each value of q', yielding the calibration curve of the form shown in FIG. 4. In the calibration curve, FIG. 4, the vertical axis is the temperature difference measured at the gamma thermometer detector and the horizontal axis is the power per unit length of thermocouple tube.

In a manner identical to the above, current is applied to thermocouple tubes 6B and 6C and the temperature differences $\Delta T$ are determined for chambers 4B and 4C at each value of applied power.

With this background on applied cooling flow, electric current application and temperature difference measurements, I would now like to emphasize another requirement of this calibration method. For precise accuracy it is essential that thermocouple tubes 6A, 6B and 6C all be heated at the same power per unit length simultaneously when the measurements of q' and $\Delta T$ are produced for each chamber 4A, 4B and 4C. This is because this is the same manner in which the gamma ray heating will heat each chamber. I further wish to note that in this electrical calibration, the tube 5 and the insulators 13 are not subjected to heat generation although in the nuclear reactor core these structures will be heated by gamma ray heating. This, however, is of no significant consequence to the calibration because these structures are very effectively cooled by the cooling fluid in channel 14 of FIG. 2 during the nuclear reactor operation and the gamma ray heating of tube 5 and insulators 13 will have only a negligible influence on the temperature difference between thermocouple junction 7 and thermocouple junction 8.

For ease in handling the calibration data, equation 1 may be modified as follows:

Let q' represent the heat generation per unit length of thermocouple tube. Then the total heat generation in length L is q'L. If the thermocouple tube has a cylindrical shape of length L, the volume in length L is $\pi(\gamma_o^2 -$ $\gamma_i^2$) L where $r_o$ and $r_i$ are the outer end inner radii of the tube.

Then q, the heat generation per unit volume, may be written as $$q = \frac{q'L}{\pi(r_o^2 - r_i^2)L} \text{ or}$$

$$q = \frac{q'}{\pi(r_o^2 - r_i^2)}$$

and by substituting this expression for q, equation 1 becomes $$\Delta T = \frac{q'L^2}{\pi(r_o^2 - r_i^2)K} . \quad (2)$$

If the total power applied to the thermocouple tube during calibration is Q and the total length is l then $q' = Q/l$ and this number $q'$ is thus readily determined during calibration by measuring the total power input Q and knowing the total length l.

During operation within the nuclear reactor, measurement of the temperature difference signal $\Delta T$ will enable the determination of the gamma heat generation rate per unit length $q'$. With the knowledge of $q'$ at a multitude of strategic locations within the nuclear reactor core, and with a knowledge of the total nuclear reactor core power from other measurements, and with the utilization of appropriate nuclear physics calculations, it is then possible to determine the power distribution within the nuclear reactor core.

The aforementioned method of calibration can also be applied for an alternate construction of the gamma thermometer detectors in which the ceramic shape 13 is replaced with a solid metal shape, but the thermocouple wire is coated with a thin coating of ceramic insulation by plasma spray techniques so as to provide electrical insulation between the thermocouple tube and the metal shape 13.

The method of calibration which has been described may be performed after the gamma thermometer assembly has been fabricated, but prior to installation into the nuclear reactor core. The calibration may also be determined after the apparatus is installed into the nuclear reactor core, for example, prior to first power operation of the nuclear reactor core or during shutdown of the nuclear reactor core after a period of extended operation. In addition, the calibration may be checked while the nuclear core is at power operation.

In this latter case, one procedure would be the following:

a. With no electrical power input, measure the temperature difference that results from gamma heating with the core at power and then utilizing the calibration curve of FIG. 4, determine the corresponding value of the power per unit length of thermocouple tube.

b. Next, apply an increment of electric power to the thermocouple tube. Add this value of electric power to the gamma heating power determined in step a. Measure the temperature difference of the gamma thermometer detector. This temperature difference and the total of the gamma heating power and the electrical heating power may then be plotted on the original calibration curve as a check on the retention of the original calibration.

c. Step b may be performed for several increments of electric power heating.

It should be clear that suitable equipment can be constructed for performing these calibrations on an expedient and automatic or semi-automatic basis including computer storage of all calibration data, and provisions for data collection, data treatment and updating of calibrations.

The aforementioned method of calibration may be modified for the case in which the ceramic shape 13 is replaced with a solid metal shape but the thermocouple wire is not electrically insulated from the solid metal shapes as described previously. For this case, electrical calibrations are achieved prior to insertion into the nuclear reactor core, but they may not be as easily achieved after insertion into the nuclear reactor core. This calibration is achieved by the passage of an electric current through the entire assembly of gamma thermometers along the length. That is, the electric current is not applied at the ends 16 of the thermocouple tube 6A and the equivalent ends of thermocouple tubes 6B and 6C. The electric current is instead applied at each end of the containment tube 5 with one electrical connection being made at the lower end of the tube, below chamber 4A as shown in FIG. 2 and the other electrical connection being made at the upper end of the containment tube 5, near the upper end cap 10. The device would be fluid cooled during the calibrations just as in the previous cases. If n represents the total number of gamma thermometer chambers and if I represents the total electric current flow along the length of the assembly, then the current flow i through the gamma detector thermocouple tube is derived as follows:

Let $\rho_c$ represent the electric resistivity of the containment tube 5 of cross sectional area $A_c$. Let $\rho$ represent the electrical resistivity of the thermocouple tube of cross sectional area A. Then, for the length L of each gamma thermometer chamber the electric resistance of the containment tube 5 is $R_c = \rho_c L/A_c$ and the electric resistance of the thermocouple tube is $R = \rho L/A$. Each chamber has several thermocouple tube current paths, and if there are several (n) gamma thermometer chambers along the length of the assembly there are therefore 2n current paths per chamber. Then, the relationship of the current flow i to the total measured current flow I is $$i = \frac{R_c}{R + R_c 2n} I.$$

During electrical calibration, the heat generation $q'$ of each thermocouple tube over length L is $$q' = i^2 R$$

$$= \left(\frac{R_c}{R + R_c 2n}\right)^2 I^2 R.$$

I will now describe yet another construction of gamma thermometers to which my method of calibration may be applied. This construction of gamma thermometers is shown in FIG. 5. The gamma thermometer assembly 17 is located within an instrumentation tube 3 with a fluid cooling channel 14 as in the previous embodiment. For this construction the thermocouple tube 23 contains several thermocouple assemblies 20. Each thermocouple assembly 20 contains two thermocouple junctions which are differentially connected as in the previous embodiment. I will first describe the construction of the thermocouple assembly 20, before continuing with the description of the gamma thermometer assembly 17.

The differential thermocouple assembly 20 is shown in greater detail in FIG. 7. Thermocouple junctions 21 and 22 are formed by junctions of dissimilar metal wires 26 and 27 and the voltage signal from terminals 26 represents the difference in voltages generated at the junctions 21 and 22. This assembly 20 includes a containing tube 24 and ceramic insulation 25 and an end cap 28. In these commercially available differential thermocouples, the junction 21 is located at a substantially precise point, while the junction 22 tends to be elongated over a length of several thermocouple wire diameters. The junction 22 is elongated because the junction is made prior to the drawing or swaging operations in the thermocouple production, while the junction 21 is more precisely located because it is made after the drawing or swaging processes are completed. The relatively elongated nature of the thermocouple junction 22 does not adversely influence the calibration of the gamma thermometer detector because there is no significant axial temperature gradient within the thermocouple tube 23 for the relatively small length of the elongated junction 23. In order to preserve the constant cross section shown in FIG. 6, along the length of the assembly 17, it is common practice to add a "dummy" ceramic filled section as shown in FIG. 7 to complete the length above the monitored gamma thermometer chamber. This is commonly achieved by welding together the two end caps 28.

Returning to FIG. 5, the thermocouple tube 23 has several gamma thermometer positions and two of these locations are illustrated by deflector sleeves 18A and 18B which are welded or otherwise bonded to thermocouple tube. Deflector sleeve 18A is associated with the thermocouple assembly which contains junctions 21A and 22A. Thermocouple junction 21A is located within the chamber 19A of deflector sleeve 18A. As in previous embodiments, chamber 18A may be either gas filled or at vacuum conditions. The deflector sleeves 18A and 18B are impervious to fluid penetration so that vacuum or gas filled conditions can be maintained. The thermocouple junction 21A is located at the elevation of the midplane of chamber 19A, and the thermocouple 22A is located below deflector sleeve 18A and at a distance approximately equal to four times the diameter of thermocouple tube 20 from the outside lower surface of deflector sleeve 18A.

The construction of the other gamma thermometer position that is illustrated has the same construction as discussed. In this case deflector sleeve 18B has chamber 19B either gas filled or at vacuum with thermocouple junction 21B of the thermocouple assembly type 20 located at the elevation of the midplane of chamber 19B and thermocouple junction 22B located below deflector sleeve 18B and at a distance approximately equal to four times the diameter of thermocouple tube 20 from the outside lower surface of deflector sleeve 18B.

With the gamma thermometer assembly installed within the nuclear reactor core and with the core operating at power, the assembly materials will be heated throughout their volume by gamma ray heating. Thermocouple 22 will operate at a temperature very nearly equal to the fluid coolant temperature because of its good thermal contact to the thermocouple tube 23. However, thermocouple 21 will operate at a substantially higher temperature because chamber 19 prevents direct fluid contact with the thermocouple tube in the vicinity of 21.

Section 6—6 is an enlarged section from FIG. 5 and is shown in FIG. 6. FIG. 5 illustrates an arrangement of seven thermocouple assemblies 20 within the thermocouple tube 23, or one thermocouple assembly for each of seven gamma thermometer locations along the length of assembly 17 of FIG. 2. As previously described, two of the gamma thermometer locations are illustrated in FIG. 2, one at the location of deflector chamber 18A and the other at the location of deflector chamber 18B.

With the nuclear reactor core operating at power, the temperature difference between thermocouple junction 21 and junction 22 for length of chamber 19 equal to L, is very nearly expressed as follows if junction 21 is centered in length L:

$$\Delta T = (qL^2/8K) \tag{1}$$

This is the same equation (1) presented previously.

The method of electrical calibration may be applied to this arrangement of gamma thermometers by applying an electric current through the length of the assembly 17 while the assembly is water cooled or fluid cooled. First, the assembly 17 is installed into appropriate equipment to provide fluid cooling at approximately the same conditions of temperature, pressure and fluid velocity than will later apply during operation within the nuclear reactor core. Next, electrical connections are made at each end of the assembly 17 by means of electrical contacts at the ends of the thermocouple tube 23. Then with cooling flow established, electrical current is passed along the length of the assembly 17 and the temperature difference $\Delta T$ between thermocouple junctions 21A and 22A is measured. Likewise, the temperature difference between thermocouple junctions 21B and 22B is measured and, likewise, the temperature differences at the other gamma thermometer detectors that are not illustrated in FIG. 5 are measured. Thus, a value of $\Delta T$ is determined at each detector for each of several values of electric current I applied to assembly 17. If the electrical resistance of the thermocouple tube 23 is R over the length L of the chamber 19A, and if the electrical resistance of the deflector sleeve 18A is $R_c$ over length L, then the current i through the thermocouple tube is approximately related to the total measured current I as follows:

$$i = \frac{R_c}{R + R_c} I$$

There will be some deviations from this relationship because of the contact length between the containment sleeve 18A and the thermocouple tube 23 and also because of the radial path for some of the current flow entering and exiting sleeve 18A. These exact deviations will depend on exact dimensions and the more exact relationship between i and I can be determined by analysis of the exact shapes.

Figure 4:
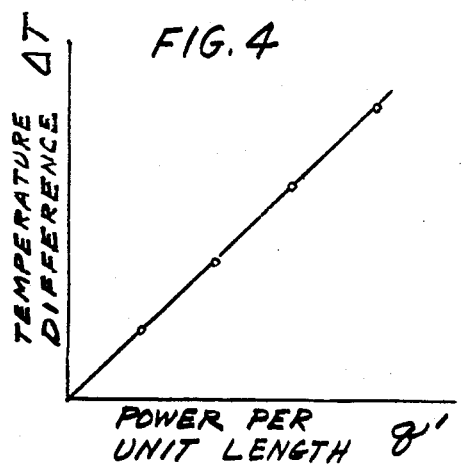
FIG. 4 illustrates a typical calibration curve for the gamma thermometer.

With the measurement of $\Delta T$ as a function of I, and with the conversion of I values to i values as described, $\Delta T$ is determined as a function of $q'$ and the calibration of FIG. 4 is established for this device.

After completion of all of the electrical calibrations, a set of assemblies 17 is installed into the nuclear reactor core as illustrated in FIG. 1. Then with the nuclear reactor core operating at power, the gamma ray heating will give rise to a temperature difference signal, $\Delta T$, at each detector location. Then for each detector location, the corresponding calibration curve as illustrated by FIG. 4 is applied to determine the local rate of gamma ray heating. With the knowledge of the rate of gamma ray heating at each of the strategic locations within the nuclear reactor core, and with the application of appropriate principles of nuclear reactor core nuclear physics, and with the knowledge of the total reactor power level from other measurements; this knowledge is applied in a logical manner to determine the power distribution throughout the nuclear reactor core.

I will finally describe another construction of gamma thermometer to which my method of calibration may be applied. The construction of this gamma thermometer is shown in FIG. 8. The assembly 29 of FIG. 8 is similar to the construction of the assembly 20 of FIG. 7 except that an open chamber 30 is now located in the region of hot thermocouple junction 31. A series of these thermocouple assemblies may be located within a fluid cooled thermocouple tube 23 as illustrated in FIG. 5 and FIG. 6. The containment sleeves 18A and 18B would be omitted from assembly 17 of FIG. 5 for this embodiment.

With the nuclear reactor operating at power all components of the gamma thermometer assembly are heated by gamma ray heating including the thermocouple wires 26 and 27 of assembly 29. With fluid cooling in passage 14, all components of the assembly 17 will operate at a temperature only slightly greater than the temperature of the fluid in passage 14 of FIG. 5, with the exception of thermocouple junction 31 of FIG. 8. Thermocouple junction 31 is thermally insulated from its surroundings by the open chamber 30.

If L is the total length of thermocouple wires 26 and 27 that are located within the chamber 30, the temperature difference, $\Delta T$ between thermocouple junction 31 and junction 22 will be of the form:

$$\Delta T = \frac{\bar{q}L^2}{8A\bar{K}} \quad (2)$$

where q is the heat generation per unit volume of wires 26 and 27, adjusted to account for the differences between the real rates in each of the two different materials and K is the thermal conductivity of the thermocouple wire, but also adjusted to account for the fact that each of the different thermocouple materials has a different thermal conductivity. The constant A is a correction factor to account for the fact that the temperature at the thermocouple junction may not be the maximum temperature along the wire within the open chamber 30 of FIG. 8. Indeed, the relationship between $\Delta T$ and L of equation (2) may be an equation of some other form. The point of this discussion is that an equation with appropriate constants can be written from a knowledge of the exact structure of this gamma thermometer assembly.

This gamma thermometer 29 can be electrically calibrated, however, the calibration procedure and the relationship of the electrical calibration to the gamma heating calibration is more complicated than for the other embodiments which have been described. The procedure involves impressing an electric current through wires 26 from the terminal end while the gamma thermometer assembly is fluid cooled. This heating current is momentarily interrupted and the thermocouple signal is then recorded on suitable apparatus within the very short time span of the interruption of the electric current. The electric current is then reapplied and several such measurements are made to insure that the thermocouple junctions 31 and 22 are yielding a steady state temperature difference. The electrical apparatus for the interrupted heating and rapid measurement of the thermocouple signal is not described herein, but can be provided by any competent technologist. The electrical resistance of thermocouple wire 26 will probably have a different value than the electrical resistance of thermocouple wire 27 and this factor will have to be considered in deducing a gamma ray heating calibration from the calibration that is determined by electric resistance heating. However, with knowledge of the construction of the gamma thermometers suitable analytical methods will yield the necessary translations between the calibration characteristic that is determined by electric resistance heating and the applicable calibration characteristic for gamma ray heating.

The method of electric calibration which has been described for the above embodiments has been described in terms of steady-state measurements in which the electric power is applied to the fluid cooled gamma thermometer and the temperature measurements are made at a time in which the temperatures have reached steady values. It is also possible to determine the transient behavior of the gamma thermometer by means of techniques that employ electric resistance heating. For example, the transient response of the gamma thermometer to a prompt step increase in the rate of heat generation may be determined, or likewise a prompt step decrease in applied power. Furthermore, the response of the gamma thermometer to other time changes of power generation such as steadily increasing ramp rates of power with time, or steadily decreasing ramp rates of power with time, or more complex functions such as sinusoidal changes of power with time can all be determined by appropriate application of the method of electric calibration of the gamma thermometers.

The specific application of these methods is illustrated by reference to the embodiment of the assembly, shown in FIG. 2, although the techniques with some variation would apply to any gamma thermometer which can be calibrated by electric resistance heating. With fluid cooling flow established in channel 14, and with suitable recording apparatus measuring the temperature difference signal from thermocouple terminal ends 15, and with suitable apparatus in place for applying electric current to the terminals 16 and recording the value of the electric power applied to the terminals 16, the transient measurements may begin. For example, with no power applied to the gamma thermometer all signal recording would begin, next a step increase of electric power could be applied at terminals 16 and data would be collected during the time that the thermocouple signal from terminals 15 increased to steady values. Next, the power could be suddenly disconnected and the temperature difference data would be collected from terminals 15 until the temperature difference was O. From these data the time constant of the gamma thermometer can be determined. Similarly, other time dependent changes of power can be applied to the terminals 16 while the applied power is recorded and the temperature difference signal 15 is recorded. From these measurements it is possible to determine accurately the transfer function of the gamma thermometer assembly.

The accurate steady state calibrations which have been described herein enable the application of gamma thermometers in the accurate determination of power distribution within nuclear reactor cores. The accurate knowledge of the transient response of the gamma thermometer signal relative to the transient power behavior of the nuclear reactor core makes it possible to devise suitable interpretive equipment to also utilize gamma thermometer signals for reactor core control functions, such as reduction of the reactor core power production in the event of an approach to an excessive rate of local power generation.

I claim to have invented:

1. The method of monitoring elongated fuel elements, which emit gamma rays, of a nuclear reactor core, comprising:
   providing an elongated instrument element and locating said instrument element in its monitoring position which is adjacent to, and parallel to, said elongated fuel elements,
   passing a cooling fluid adjacent said elongated instrument element,
   at least partially isolating a zone of said instrument element from said cooling fluid so that said zone rises in temperature as a result of impingement of said gamma rays thereon,
   providing a zone whose temperature depends upon the temperature of said cooling fluid to a greater degree than the temperature of said first-named zone depends upon the temperature of said cooling fluid,
   measuring the temperature difference between said zones, and
   calibrating the elongated instrument element, by (1) heating the instrument element with measured electrical power while it is in said monitoring position and the temperature difference between said zones is being measured, and (2) analyzing the results of the last-named measurement.

2. The method as defined in claim 1 in which the measured electrical power is varied during the calibration stop and the temperature difference between said zones is measured for different values of said power.

3. The method as defined in claim 2 in which the calibration step is performed while the nuclear reactor core is on.

4. The method of monitoring elongated fuel elements of a nuclear reactor core comprising:
   providing an elongated measuring instrument and locating it adjacent, and parallel, to said elongated fuel elements,
   cooling the elongated measuring instrument with reactor cooling fluid,
   changing the direction of flow of the cooling fluid to divert the cooling fluid away from the elongated measuring instrument at a plurality of spaced limited portions of the length of said elongated measuring instrument while passing the cooling fluid in contact with the elongated measuring instrument at other portions of said elongated measuring instrument while the reactor is in operation, and
   separately making a plurality of temperature difference measurements, with each such measurement being between one of said portions about which the cooling fluid was diverted and one of said portions which is contacted by the cooling fluid.

5. In the method of claim 4:
   insulating the portions of the measuring instrument about which the cooling fluid is diverted, from the cooling fluid, by maintaining an evacuated or gaseous space between said last-named portions and the cooling fluid.

6. In the method of claim 5:
   providing a sealed chamber to divert said cooling fluid.

7. In apparatus for monitoring elongated fuel elements that emit gamma rays, of a nuclear reactor core:
   an elongated measuring instrument having a plurality of thermocouples with their hot junctions spaced apart along the instrument and respectively responsive to the temperatures of the portions of the instrument where the hot junctions are located,
   each said hot junction being spaced apart from its complementary cold junction,
   means for guiding said cooling fluid along said elongated measuring instrument to cool the instrument where the cooling fluid contacts it while the reactor is in operation,
   each said cold junction being responsive to the temperature of a part of the instrument cooled by said cooling fluid,
   insulating means surrounding a portion of the measuring instrument where each hot junction is located to insulate such portion of the instrument from the cooling fluid; whereby the gamma rays may heat the portion of the instrument to which the hot junctions are responsive;
   said insulating means including means for diverting said cooling fluid away from said measuring instrument at the places where said hot junctions are located.

8. Apparatus as defined in claim 7 in which each said insulating means comprises a sealed chamber surrounding the portion of the instrument where a hot junction is located.

9. Apparatus as defined in claim 8 in which a partial vacuum exists in said sealed chamber.

10. Apparatus as defined in claim 8 in which said sealed chamber contains a gas.

11. Apparatus as defined in claim 8 in which said sealed chamber is welded to said measuring instrument.

12. Apparatus as defined in claim 8 in which said sealed chamber is composed of material impervious to fluid flow therethrough.

13. The method of monitoring the elongated fuel elements of a nuclear reactor core which elements emit gamma rays, comprising:
   providing an elongated measuring instrument constructed to be heated to a greater extent by said gamma rays at certain zones along its length than at least, one other zone along its length,
   calibrating said instrument which electrical resistance heating that provides heating at each zone of the same magnitude to that of said gamma rays while the reactor is in operation,
   locating said instrument adjacent, and parallel, to said elongated fuel elements, and
   making measurements, based on the heating contributed by said gamma rays to at least some of said zones, which in view of said calibrations enables a determination of the power outputs of the fuel elements at different positions along their lengths.

14. The method of claim 13 in which the calibrating step precedes the step of locating the measuring instrument adjacent to the elongated fuel elements.

15. The method of claim 13 in which the calibrating step is performed after the step of locating the measuring instrument adjacent to the elongated fuel elements.

16. The method of claim 13 comprising checking the calibration of the instrument by again calibrating it after turning on the power at the elongated fuel elements.

17. The method of monitoring elongated fuel elements, which emit gamma rays, of a nuclear reactor core, comprising:
   (a) providing a flow path for the flow of a cooling fluid to be used for calibration purposes, and passing said cooling fluid along said flow path for calibration purposes,
   (b) providing an elongated instrument element including electrical conducting material having first and second zones,
   (c) locating said instrument in said flow path and exposing it to said fluid so that the temperature of the second zone depends on said temperature and rate of flow of said cooling fluid more than the temperature of the first zone depends on the temperature and rate of flow of said cooling fluid,
   (d) passing an electrical current, for calibration purposes, through said electrical conducting material to supply heat to both of said zones with the first zone rising in temperature more than the second zone due to cooling effect of said cooling fluid on said second zone,
   (e) measuring the temperature difference between said first and second zones to calibrate the instrument,
   (f) placing the instrument parallel to and adjacent said elongated fuel elements,
   (g) passing a cooling fluid past the instrument while it is adjacent said elongated fuel elements,
   (h) the step of passing a cooling fluid past the instrument for calibration purposes as aforesaid involving fluid cooling conditions substantially identical to those characterizing the cooling fluid that is passed by the instrument while it is adjacent to the elongated fuel elements, and
   (i) measuring the temperature difference between said two zones while the instrument is adjacent the elongated fuel elements with cooling fluid flowing past the same and without said electrical current flowing, whereby in view of the previous calibration of the instrument with said flow of current the output of the elongated fuel elements may be determined.

18. The method of claim 17 in which during step (i), the first zone rises in temperature above the second zone by an amount related to the output of the elongated fuel elements, and in which water is selected as the cooling fluid.

19. The method of claim 18 in which the cooling fluid is in such good thermal contact with the second zone that the second zone remains at a temperature substantially the same as that of the cooling fluid with the first zone rising to a higher temperature both during calibration as well as during operation adjacent the elongated fuel elements.

20. The method of monitoring elongated fuel elements as defined in claim 17 in which steps (a) to (e) inclusive are performed with said instrument positioned in a remote location with reference to said elongated fuel elements so that those elements do not supply substantial gamma rays to the instrument and so that the instrument is calibrated while the only heat supplied to the instrument during calibration results from said electrical current, and
   performing steps (f), (g) and (i) after the instrument has been calibrated in said remote location.

21. The method of monitoring elongated fuel elements as defined in claim 20 in which the instrument is calibrated as set forth in said steps (a) to (e) using a first flow path for the cooling fluid, and the elongated fuel elements are monitored as set forth in steps (f), (g) and (i) using a second flow path for the cooling fluid which second path is adjacent said elongated fuel elements and is remote from the first flow path.

22. The method of monitoring elongated fuel elements as defined in claim 17 in which step (f) is performed before the instrument is calibrated, and in which:
   the nuclear reactor core is shut down before the instrument is calibrated and in which the instrument is calibrated as called for by said steps (a) to (e) while the instrument is adjacent the elongated fuel elements and the nuclear reactor core is shut down.

23. The method of monitoring elongated fuel elements as recited in claim 22 in which the same flow path for the flow of the cooling fluid is used during said calibration steps (a) to (e) inclusive as is used for the monitoring steps (g) and (i).

24. The method of monitoring elongated fuel elements as recited in claim 17 in which the calibration steps (a) to (e) inclusive are performed while said instrument is adjacent said elongated fuel elements and while the nuclear reactor core is in operation,
   said calibration and monitoring steps comprising comparing the temperature differences between said zones under two conditions one of which conditions occurs while said electrical current is off and the other of which conditions occurs while said electrical current is on.

25. The method of monitoring elongated fuel elements as recited in claim 24 in which the calibration steps (a) to (e) inclusive are performed using several increments of electric power heating.

26. The method of monitoring elongated fuel elements as defined in claim 17 in which said measuring step (e) includes measuring the temperature difference between the "hot" and "cold" junction of a thermocouple, comprising:
   spacing said "hot" junction from all nearby liquid and solid matter while exposing said "hot" junction to said gamma rays.

27. The method of monitoring elongated fuel elements as defined in claim 26, comprising:
   positioning said "cold" junction in a bed of solid material and exposing said solid material to said cooling fluid,
   whereby said "hot" junction is heated to a temperature above said cold junction by reason of the direct impingement of said gamma rays on said "hot" junction with said cooling fluid having only a secondary effect on the temperature of said "hot" junction.

28. In apparatus for monitoring fuel elements, a nuclear reactor core:
   a measuring instrument comprising a thermocouple having a "hot" junction and a "cold" junction, said measuring instrument having a body, said body having an outer wall, said measuring instrument including means for mounting said "hot" junction inside said body and spaced from any and all liquid and solid material, said measuring instrument including solid material surrounding said "cold" junction and providing a heat conduction path from said cold junction to said outer wall, means for passing a cooling fluid along the outer wall of said body, and means for positioning said body in the path of said gamma rays to thus directly heat said hot junction, whereby the heat from said gamma rays elevates the temperature of the "hot" junction above that of the "cold" junction due to the better thermal contact between the "cold" junction and the cooling fluid than between the "hot" junction and the cooling fluid.

* * * * *

UNITED STATES PATENT AND TRADEMARK OFFICE
CERTIFICATE OF CORRECTION

PATENT NO. : 4,393,025
DATED : July 12, 1983
INVENTOR(S) : Robert H. Leyse

It is certified that error appears in the above–identified patent and that said Letters Patent are hereby corrected as shown below:

Col. 6, line 68, change "$\pi(\gamma_o^2 \text{———}$" to $-- \pi(r_o^2 \text{———} --;$ Col. 7, line 1, change "$\gamma_i^2)L$" to $-- r_i^2)L --;$ Col. 13, line 46, change "stop" to --step--.

Signed and Sealed this

Twentieth Day of December 1983

[SEAL]

Attest:

GERALD J. MOSSINGHOFF

Attesting Officer     Commissioner of Patents and Trademarks